Nov. 3, 1964    C. J. McDONALD    3,155,321
AIRPORT RUNWAY LIGHT

Filed Sept. 30, 1960    5 Sheets-Sheet 1

Inventor.
Clement J. McDonald
By Schroeder, Hofgen,
Brady & Wagner
Attorneys.

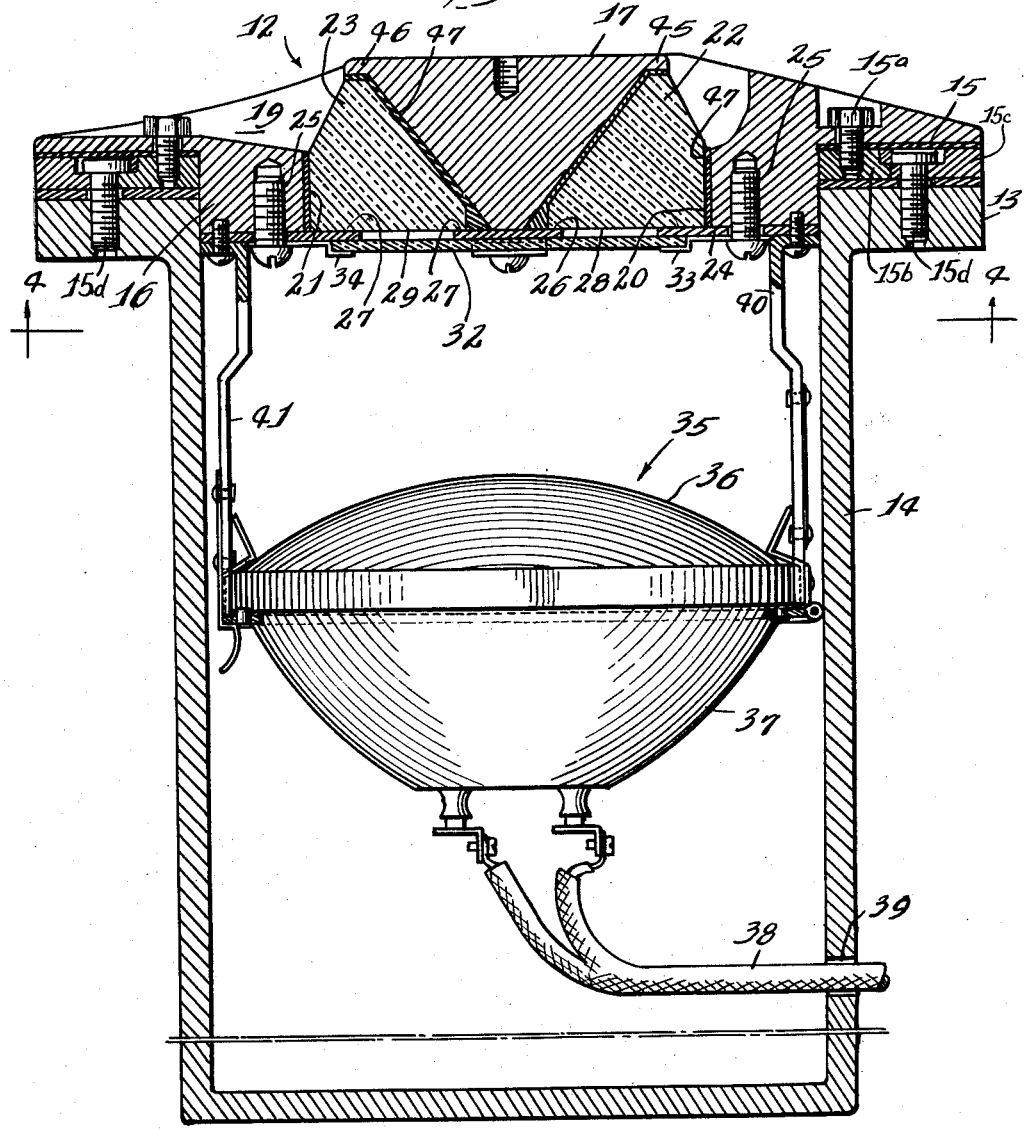

Nov. 3, 1964 C. J. McDONALD 3,155,321
AIRPORT RUNWAY LIGHT
Filed Sept. 30, 1960 5 Sheets-Sheet 3
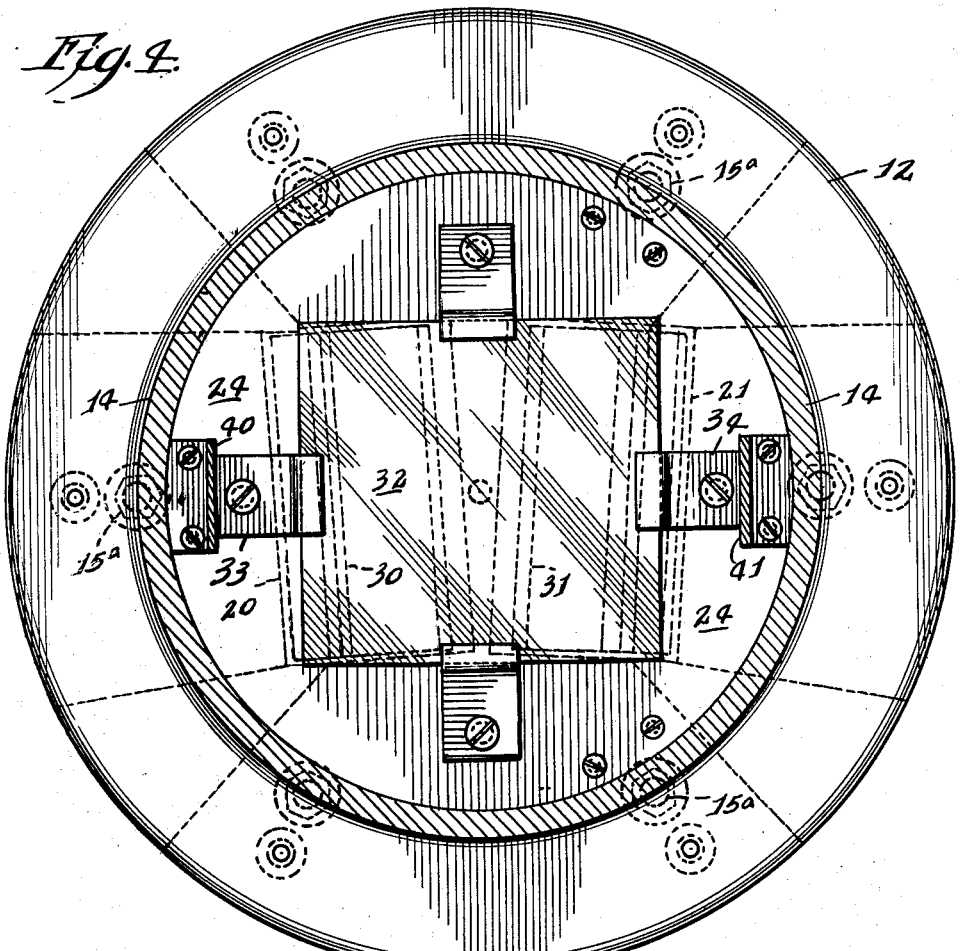
Fig. 4.
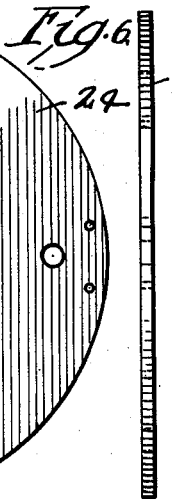
Fig. 5.
Fig. 6.
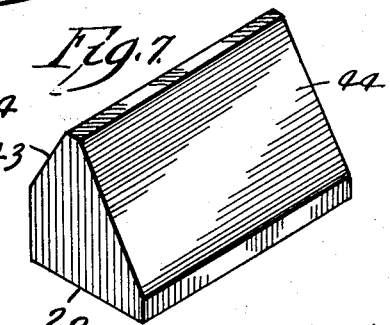
Fig. 7.
Inventor.
Clement J. McDonald.
By. Schroeder, Hofgren,
Brady & Wegner
Attorneys.

Nov. 3, 1964  C. J. McDONALD  3,155,321
AIRPORT RUNWAY LIGHT
Filed Sept. 30, 1960  5 Sheets-Sheet 4

INVENTOR.
Clement J. McDonald
BY
Hofgren, Brady, Wegner, Allen & Stellman
Attorneys Nov. 3, 1964   C. J. McDONALD   3,155,321
AIRPORT RUNWAY LIGHT
Filed Sept. 30, 1960   5 Sheets-Sheet 5

INVENTOR.
Clement J. McDonald

United States Patent Office 3,155,321
Patented Nov. 3, 1964

3,155,321
AIRPORT RUNWAY LIGHT
Clement J. McDonald, River Forest, Ill., assignor to Multi Electric Mfg., Inc., a corporation of Illinois
Filed Sept. 30, 1960, Ser. No. 61,049
3 Claims. (Cl. 240—1.2)

This invention relates to a lighting apparatus and more particularly to lighting apparatus particularly adapted for use in an airport runway lighting system.

This application comprises a continuation in part of my co-pending application Serial No. 672,049, now abandoned, for a lighting apparatus, filed July 15, 1957.

It is the general object of the present invention to produce a new and improved lighting apparatus of the character described.

It is a more specific object of the present invention to provide a lighting apparatus suitable for installation on or adjacent the runways of an airport and which is capable of producing a light beam of relatively high intensity directed in part on the runway surface and in part at a small angle above the horizontal so as to be clearly visible to an approaching aircraft.

Among the features of the present invention is the provision of a runway lighting apparatus which may be mounted so as to be almost flush with the surface of the runway so as to present no danger to an aircraft should the lighting apparatus be contacted by one of the wheels of the airplane. In addition, the apparatus is sturdily constructed so as to be capable of bearing the load imposed upon it by an aircraft running over it. A further feature of the apparatus of the present invention is the utilization of reflecting prisms arranged both to reflect and refract light from a source within the lighting apparatus to provide a beam of light oriented properly with regard to aircraft using the runway in which the device is installed.

Still another feature of the invention is the provision of a new and improved runway lighting apparatus providing an effective maximum light output while extending only approximately one-half inch above the ground level.

A still further feature is the provision of a runway lighting apparatus including new and improved means associated with the light reflecting prism for precluding damage thereto by devices such as aircraft arresting hooks.

A yet further feature is the provision of such runway lighting apparatus wherein the damage precluding means comprises a thin rib extending radially from the axis of the light source, the light source axis being in the flat central plane of the rib.

A yet further feature of the invention is the provision of such runway lighting apparatus arranged for effective maximum efficiency with a pair of prisms selectively allochirally canted relative to a plane of the axis or extending parallel to a plane of the axis.

Other and further features of the invention will be readily apparent from the following description and drawings in which:

FIG. 2 is an enlarged vertical view of the apparatus shown in FIG. 1 and taken along the line 2—2 of FIG. 3;

FIG. 4 is a horizontal sectional view taken along line 4—4 of FIG. 2;

FIG. 5 is a top plan view of a positioning plate incorporated in the apparatus;

FIG. 6 is an end view of the plate of FIG. 5;

FIG. 7 is a view of one of the prisms used in the apparatus of the invention;

Figure 1:
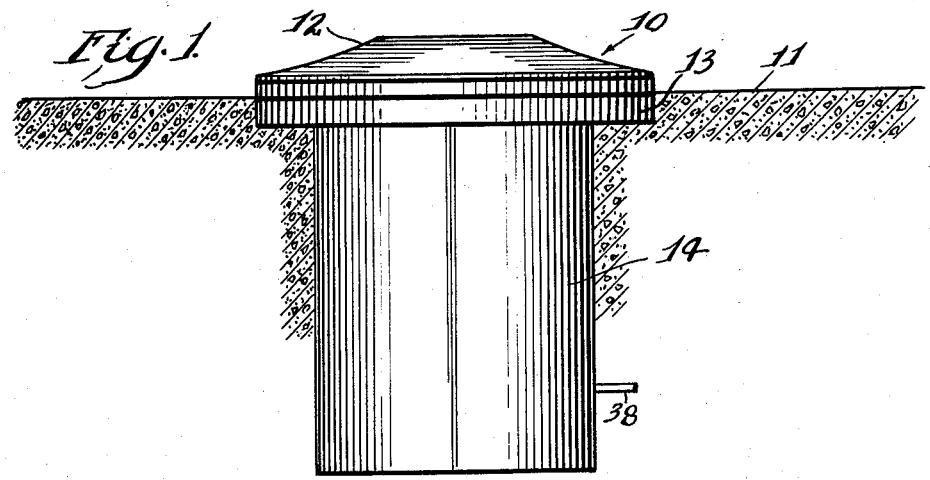
FIG. 1 is a side elevational view showing the apparatus of the present invention installed on an airport runway.

While this invention is susceptible of embodiments in many different forms, there is shown in the drawings and will hereafter be described in detail certain embodiments with the understanding that the present disclosure is to be considered as an exemplification of the principles of the invention and is not intended to limit the invention to the embodiment illustrated. The scope of the invention will be pointed out in the appended claims.

As shown in FIGS. 1 through 7, one lighting apparatus 10 embodying the present invention is particularly adapted to be mounted almost flush with the surface 11 of an airport runway. The lighting apparatus comprises a top cover plate 12 suitably secured to the rim 13 of a substantially cylindrical housing 14 with the latter being implanted beneath the surface of the runway so as to be below ground.

Figure 3:
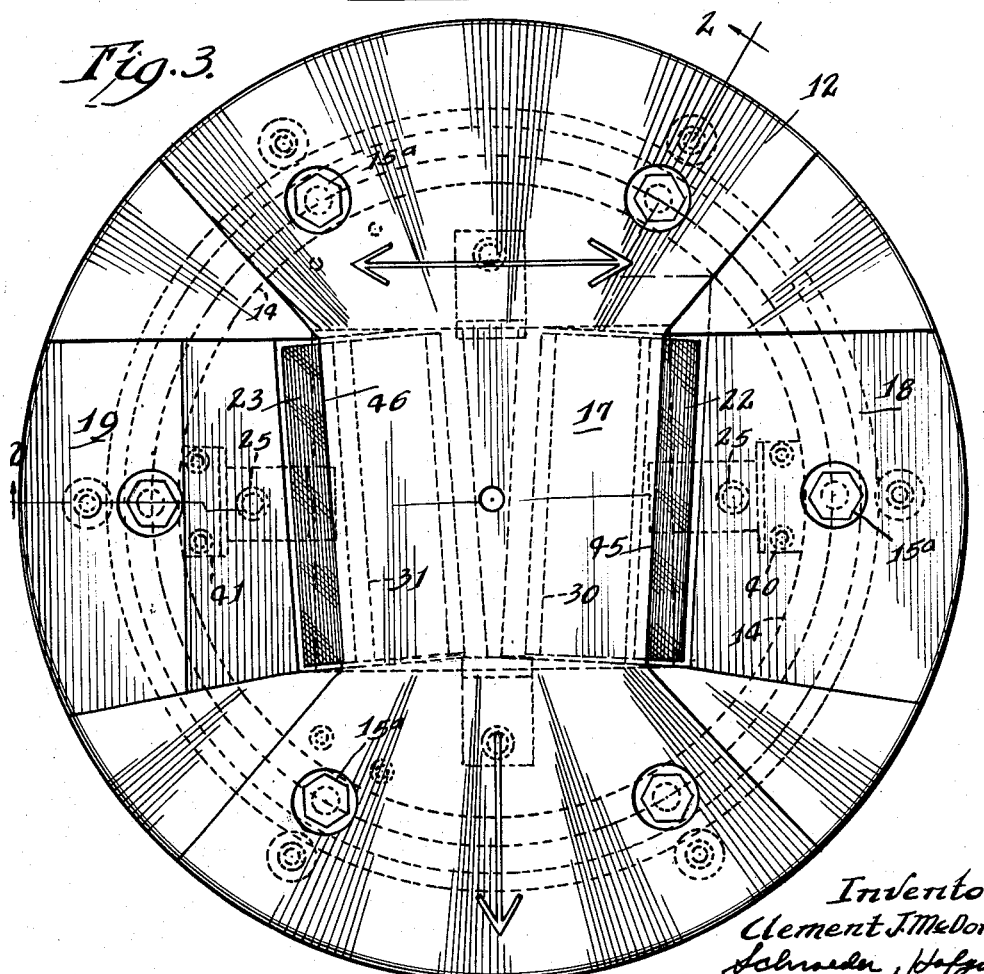
FIG. 3 is a top plan view of the runway lighting system of the present invention.

As best shown in FIGS. 2, 3 and 4, the cover plate 12 is generally circular in plan and includes an outer portion 15 secured by means of bolts 15a to an inner ring 15b which is adjustably clamped to rim 13 by a partially overlying clamp ring 15c in turn secured to rim 13 by suitable bolts 15d. Cover 12 further includes an integral downwardly depending annular portion 16 and a top portion 17 extending upwardly above the outer portion 14 a short distance. The top portion 17 is, as previously noted, an integral portion of the cover plate and, as the latter is made of relatively heavy metal, the top portion is provided with sufficient strength so as to be capable of bearing loads imposed upon it by aircraft wheels running over the lighting apparatus.

The top portion 17 extends across the upper surface of the cover plate from side to side thereof so as to provide on opposite sides of the top portion light pathways indicated as 18 and 19. It will be noted that the top portion 17 overlies a pair of openings 20 and 21 extending through the cover plate. These openings are generally rectangular in shape as indicated on FIG. 4 and provide recesses to receive a pair of reflecting prisms 22 and 23. The prisms are held in the recesses by a positioning plate 24 secured by screws 25 to the underside of the cover plate 12. The positioning plate 24 is provided with planar surfaces 26 and 27 upon which the lower faces 28 and 29 of the prisms may rest so as to assure the proper alignment of the prisms within their respective recesses. The positioning plate 24 is, of course, also provided with rectangular openings 30 and 31 immediately adjacent the planar surfaces previously mentioned. If desired, a color filter 32 may be secured by means of clips 33 and 34 to the underside of the positioning plate so as to impart a color to the light emitted from the lighting apparatus.

Beneath the positioning plate is a light source in the form of a filament-type lamp 35 having a convex lens 36 and a parabolic reflector 37. Electrical leads 38 extend through a suitable opening 39 in the side of the housing 14 for the purpose of supplying electricity to the lamp. Suitable brackets 40 and 41 secured to the underside of the cover plate support the lamp within the housing in the position shown.

The prisms 22 and 23 are, as previously mentioned, capable of both reflecting and refracting light from the source. As illustrated in FIG. 7, the lower face 29 of the prism is arranged to be located generally in a horizontal plane, but the front or emitting face of the prism 43 is not at right angles to the face 29 but, on the contrary, confronts the light pathway 19 and hence the runway at an angle of less than 90° relative to the horizontal. In the embodiment illustrated, the emitting face is at an angle of 60° relative to the horizontal. The third hypotenuse face 44 of the prism is not at an angle of 45° relative to the face 29, as is common in most reflecting prisms, but rather is at an angle of more than 45° relative thereto, i.e., approximately 52°. Thus, light entering the horizontal face 29 is reflected from the hypotenuse face 44 so as to travel in a direction at an angle of approximately 14° above the horizontal but on emerging from the front face 43 is refracted downwardly to approximately 4° above the horizontal and thus leaves the prism along a path tilted slightly upwardly relative to the horizontal.

It will be noted that the top portion 17 is provided with edges 45 and 46 which overlie the tops of the prisms 22 and 23 and thus protect the prism from damage. Cementitious material 47 between the faces of the prisms and the cover plate provides a weather-tight seal around the prisms so that no further or additional weather-tight cover need be provided for the openings 20 and 21 in the cover plate.

It will be noted that the openings 20 and 21 in the cover plate are positioned on either side of the center thereof and thus on either side of the axis of the parabolic reflector 37. The illustrated positioning of the openings and hence of the prisms mounted therein locates the faces 28 and 29 of the prisms in the areas of greatest light intensity, particularly where the lamp 35 is of the locomotive headlight variety which produces an intense beam of relatively parallel light.

It will also be noted that the prisms 22 and 23 are not precisely parallel to each other in the embodiment of the invention illustrated. Thus, the fixture shown in the drawings is designed to be installed along one edge of a runway and the prisms are so canted as to direct their light towards the center line of the runway. For centerline runway installation, the prisms would, of course, be parallel to one another.

The optical system of the lighting apparatus is designed to direct a portion of the light onto the runway surface and a portion along a beam extending upwardly toward approaching aircraft. Thus, the pilot is able to see not only the surface of the runway, but, particularly with the flat approaches utilized by jet aircraft, the pilot is also guided in part by the elevated beam of light emitted by the prisms.

While the emitting face 43 is arranged in the manner described in order to provide the necessary optics for the system, an incidental advantage to the sloping face is the fact that it provides a slanting runoff for rain water and the like. As previously noted, the cover plate is of heavy metal construction and it is arranged to be in heat transfer relationship to the lamp 35 not only for the purpose of conducting away from the lamp and housing a portion of the heat generated, but also by virtue of being heated thereby to melt away any ice or snow which might otherwise tend to accumulate on the cover and hence to obscure the light emitted from the prisms. The housing, together with the cover plate and prisms mounted therein, provide a weather- and water-tight enclosure so that maintenance problems are reduced to a minimum. By simply removing the cover plate, all parts of the apparatus subject to wear or requiring occasional replacement are made accessible and thus a minimum of labor is required for normal upkeep. The particular configuration of the prisms chosen for this application produces a higher degree of light transmission and emission along a desired path than could be obtained with simple 90° reflecting prisms.

Figure 8:
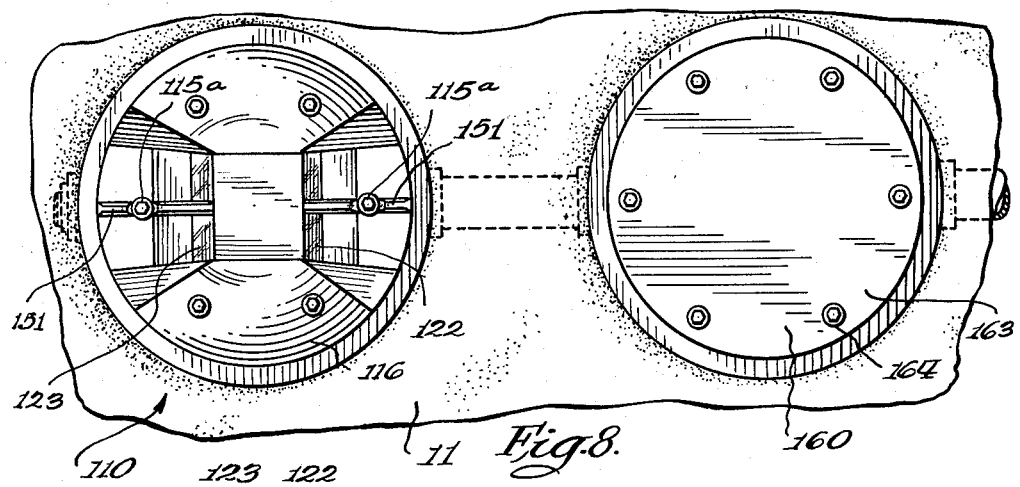
FIG. 8 is a top plan view of another form of apparatus embodying the invention implanted in a portion of a runway.
Figure 9:
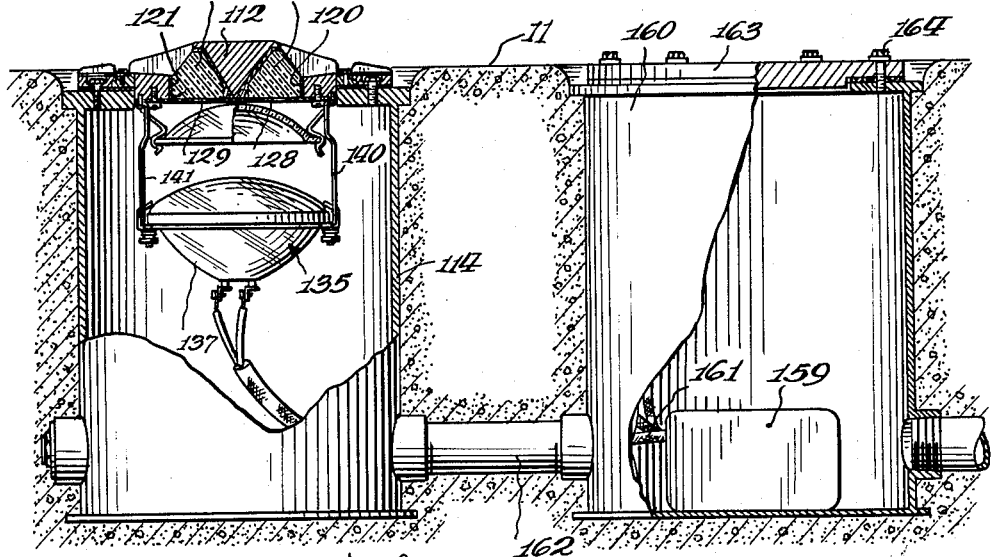
FIG. 9 is a vertical view thereof partially in diametric section and partially in elevation.
Figure 10:
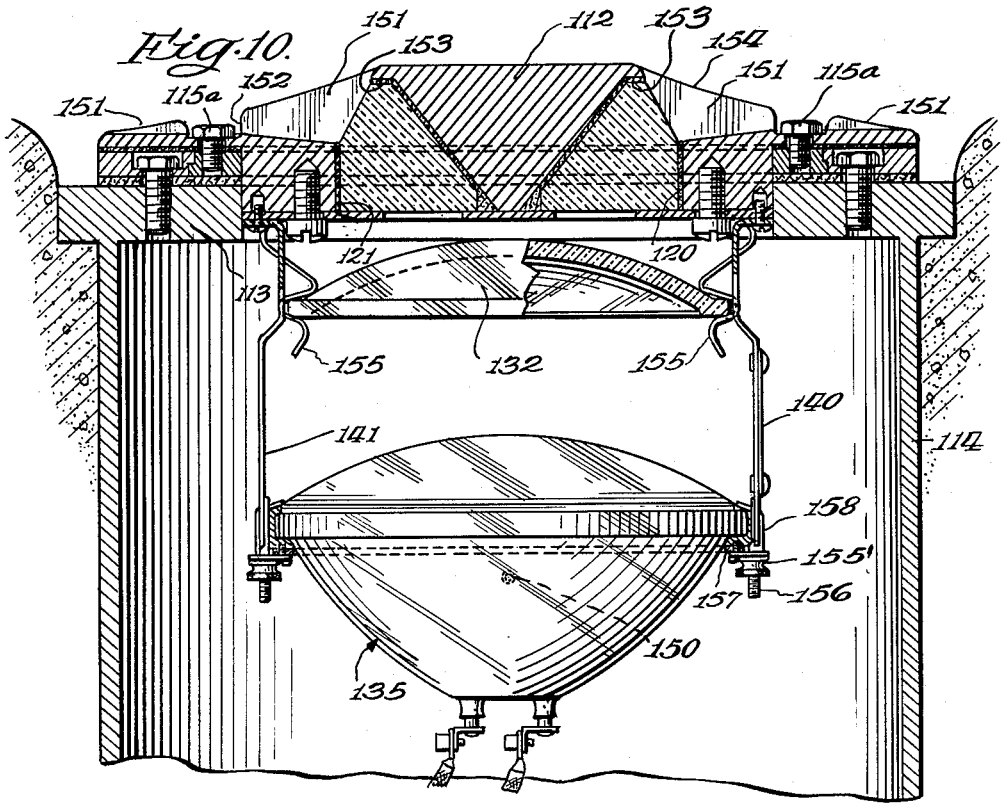
FIG. 10 is an enlarged diametric section of a portion thereof.

Turning now to the embodiment of the invention disclosed in FIGS. 8 through 10, a modified form of lighting apparatus generally designated 110 is shown to comprise an apparatus generally similar to lighting apparatus 10. Elements of lighting apparatus which are similar to corresponding elements of lighting apparatus 10 are designated by similar numerals, but 100 higher.

Figure 11:
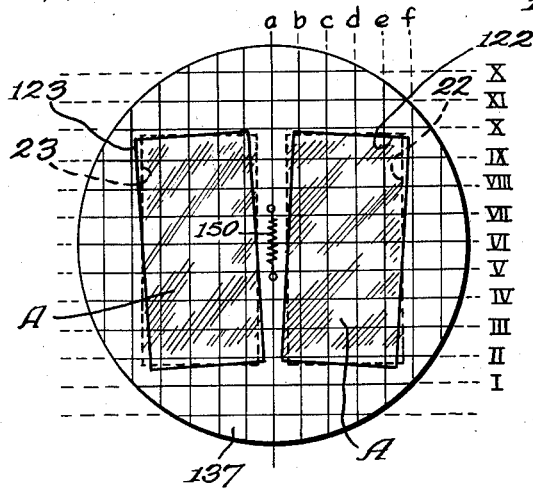
FIG. 11 is a diagram illustrating the positioning of the prisms relative to the reflector and filament of the light source.
Figure 12:
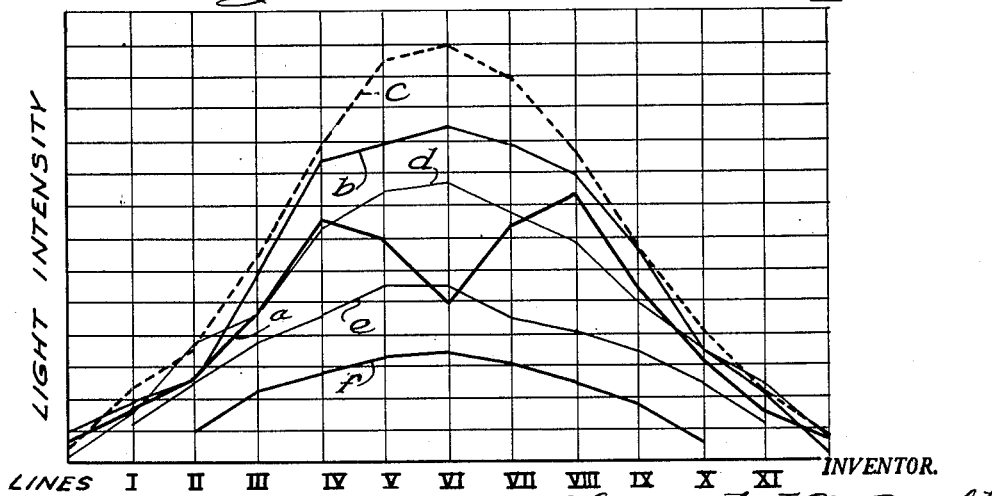
FIG. 12 is a graph showing the levels of light intensity at the different points spaced transversely from the axis of the light source as located in FIG. 11.

Lighting apparatus 110 includes a housing 114 which is diametrically somewhat larger than housing 14 and is provided with a cover plate 112 having an elevation somewhat less than that of cover plate 12, whereby the cover plate extends above the surface 11 of the runway only approximately one-half inch. The openings 120 and 121 are smaller in height than the corresponding openings 20 and 21 of apparatus 10 and the receiving faces 128 and 129 of the prisms 122 and 123 are approximately only one-half inch wide. As in apparatus 10, the prisms are positioned on either side of the axis of the lamp 135 which, as in apparatus 10, comprises a conventional lamp, such as a locomotive headlight lamp, having a parabolic reflector 137 and an elongate filament 150 extending transversely to the axis of the reflector so that when the lamp is secured in the housing by suitable brackets 140 and 141, the filament extends horizontally. More specifically, the prisms 122 and 123 have their elongated axes centered approximately seven-eighths inch from the axis of the reflector. Thus, as illustrated in FIGS. 11 and 12, the prisms of each of apparatus 10 and apparatus 110 are aligned with the elongated localized areas of high intensity light produced by the lamps 35 and 135. More specifically, such lamps deliver light substantially parallel to the axis of the reflector through a circular planar area perpendicular to the axis and confronted by the reflector in a non-uniform distribtuion across the area wherein a localized area of high intensity, elongated substantially parallel to the direction of elongation of the filament, is spaced from the reflector axis. This distribution is clearly brought out in FIGS. 11 and 12 wherein it may be seen that the light intensity is a maximum at approximately the point of intersection of lines designated c and VI. The lettered lines and lines designated by Roman numerals are equidistantly spaced. Thus, as shown in FIG. 12, moving from line c radially of the axis of the reflector 137 outwardly to line d or inwardly to line b results in a substantially greater drop in the light intensity than moving parallel to the filament and axis of reflector 137 to line VII or V. In other words, the drop-off in the intensity of the light along line c occurs less rapidly than it does along the line VI. A similar drop-off relationship occurs for the other lines so that a localized area of high intensity is provided which, as discussed above, is elongated substantially parallel to the elongate filament 150. A similar light intensity distribution occurs on the opposite side of the axis and thus two high intensity areas A are provided. As shown in FIG. 11, the prisms of lighting apparatus 10 and 110 are located to take effectively maximum advantage of this light intensity distribution whereby effectively maximum light output is provided in the beams emitted from the prisms through the openings in the housing cover plates.

Referring now more specifically to FIGS. 8 and 10, housing cover plate 112 is provided with a pair of guide ribs 151 each having a discontinuity 152 through which bolts 115a extend. The guide ribs extend radially outwardly from the center of the outlet portions 153 of the openings 120 and 121 and are relatively thin, as best seen in FIG. 8. The upper edge 154 of each guide rib is directed to above the opening portions 153 and thus deflects devices such as aircraft arresting hooks from engagement with the prisms exposed within the opening portions 153.

Clips 155 are provided for retaining a segmentally spherical color filter 132 subjacent the cover plate 112 and above the lamp 135. The means for retaining the lamp 135 on the brackets 140 and 141 herein comprises a battery nut 155' threaded on a screw 156 on an index ring 157 and a co-operating clip 158. To accommodate the additional width of the housing 114, the cover plate 112 is secured to an inturned housing flange 113 in lieu of the out-turned flange 13 of apparatus 10. In all other respects, apparatus 110 is generally similar to apparatus 10 and functions in a similar manner.

To provide improved safety in the operation of the lighting apparatus of the present invention, an isolating transformer 159 may be installed in a suitable enclosure 160 implanted in the runway adjacent the lighting apparatus housing and suitable wires 161 connected to the lamp 135 through a conduit 162 interconnecting the lighting apparatus housing and the enclosure 160. To permit facilitated maintenance, the enclosure 160 may be provided with a cover 163 secured to the enclosure by suitable means such as bolts 164.

I claim:

1. Runway lighting apparatus comprising a weathertight housing to be implanted adjacent an airport runway; a light source in the housing, said light source including a horizontally elongated filament and a single generally parabolic reflector for reflecting the light from the filament generally upwardly, said filament extending transversely to the axis of the reflector; a cover plate adapted to be secured to the top of the housing and having a top portion extending across the cover plate to define light pathways on opposite sides thereof, and a pair of reflecting prisms horizontally mounted in the cover plate below the top portion and located on either side of the axis of said reflector and substantially parallel to the filament, each of said prisms having one face confronting the light source and located generally vertically above the areas of greatest light intensity from the light source and each of said prisms having another face confronting a different one of said light pathways.

2. In a lighting source, a light providing means comprising a light source such as a locomotive headlight lamp having a parabolic reflector and an elongate filament extending transversely to the axis of the reflector for delivering light substantially parallel to said axis in a non-uniform distribution across said reflector wherein a pair of localized areas of high intensity elongated substantially parallel to the direction of elongation of the filament are spaced on either side of said axis, an elongate prism having a light-receiving face spaced from said axis confronting and generally peripherally congruent with one of said localized areas to receive substantially only high intensity light; a second elongate prism having a light-receiving face spaced from said axis and confronting and generally peripherally congruent with the other of said localized areas to receive substantially only high intensity light, each of said prisms having additional faces for redirecting the high intensity light to emerge from the prisms in a pair of oppositely directed thin beams substantially transverse to said axis; and enclosure means housing the light source and prisms and provided with an outlet opening for passing said beams from the prism laterally from the housing, said housing being adapted for implantation with the outlet opening exposed.

3. In a lighting source, light providing means comprising a light source such as a locomotive headlight lamp having a parabolic reflector and an elongate filament extending transversely to the axis of the reflector for delivering light substantially parallel to said axis in a non-uniform distribution across said reflector wherein a pair of localized areas of high intensity elongated substantially parallel to the direction of elongation of the filament are spaced on either side of said axis, an elongate prism having a light-receiving face spaced from said axis confronting and generally peripherally congruent with one of said localized areas to receive substantially only high intensity light, said prism having additional faces for redirecting the high intensity light to emerge from the prism in a thin beam substantially transversely to said axis; and enclosure means housing the light source and prism and provided with an outlet opening for passing said beam from the prism laterally from the housing, said housing being adapted for implantation with the outlet opening exposed.

References Cited in the file of this patent

UNITED STATES PATENTS

| | | |
|---|---|---|
| 2,284,878 | McDowell | June 2, 1942 |
| 2,848,597 | Knottnerus | Aug. 19, 1958 |
| 3,007,034 | Reed et al. | Oct. 31, 1961 |

FOREIGN PATENTS

| | | |
|---|---|---|
| 759,847 | Great Britain | Oct. 24, 1956 |
| 759,848 | Great Britain | Oct. 24, 1956 |

OTHER REFERENCES

Military Specification, MIL-L-2690A (USAF), Light, Marker, Airport Runway, Flush, Type MC-2, Mar. 19, 1958.